United States Patent
Blanchard et al.

(10) Patent No.: US 11,659,962 B2
(45) Date of Patent: May 30, 2023

(54) TUB LINER FOR INFANTS BATHTUB

(71) Applicant: Catapult Products, LLC, Salt Lake City, UT (US)

(72) Inventors: Daniel B. Blanchard, Bountiful, UT (US); Dana L. Denton, Salt Lake City, UT (US); Marshall T. Denton, Salt Lake City, UT (US); William C. Ballard, Millcreek, UT (US); Mark A. Christensen, Salt Lake City, UT (US)

(73) Assignee: Catapult Products, LLC, Salt Lake City, UT (US)

( * ) Notice: Subject to any disclaimer, the term of this patent is extended or adjusted under 35 U.S.C. 154(b) by 260 days.

(21) Appl. No.: 17/214,680

(22) Filed: Mar. 26, 2021

(65) Prior Publication Data
US 2021/0298536 A1 Sep. 30, 2021

Related U.S. Application Data

(60) Provisional application No. 63/002,934, filed on Mar. 31, 2020.

(51) Int. Cl.
*A47K 3/00* (2006.01)
*B32B 3/26* (2006.01)
*B32B 27/32* (2006.01)
*B32B 27/08* (2006.01)
*A47K 3/024* (2006.01)

(52) U.S. Cl.
CPC .............. *A47K 3/001* (2013.01); *A47K 3/024* (2013.01); *B32B 3/266* (2013.01); *B32B 27/08* (2013.01); *B32B 27/32* (2013.01); *B32B 2307/412* (2013.01); *B32B 2307/7265* (2013.01); *B32B 2555/00* (2013.01)

(58) Field of Classification Search
CPC ........ A47K 3/001; A47K 3/024; B32B 3/266; B32B 27/08; B32B 27/32
USPC .......................................................... 4/572.1
See application file for complete search history.

(56) References Cited

U.S. PATENT DOCUMENTS

| | | | | |
|---|---|---|---|---|
| 1,992,008 A | * | 2/1935 | Innis | A47K 3/001 D23/280.4 |
| 2,319,603 A | * | 5/1943 | Henry | A47K 3/001 4/580 |
| 2,547,743 A | * | 4/1951 | Burr | A47K 3/024 D23/278 |
| 2,671,907 A | * | 3/1954 | Sterling | E04G 21/30 4/DIG. 18 |
| 5,216,764 A | * | 6/1993 | Hall | A47K 3/001 4/244.3 |
| 10,376,105 B2 | * | 8/2019 | Opasik | A47K 3/001 |
| 10,806,303 B1 | * | 10/2020 | Koumsongo | A47K 11/105 |
| 2019/0110645 A1 | * | 4/2019 | Denton | A47K 3/024 |

* cited by examiner

*Primary Examiner* — Benjamin R Shaw
(74) *Attorney, Agent, or Firm* — Brian C. Trask (57) ABSTRACT

A disposable liner for use with a reusable infant's bathtub. A workable liner may be formed from two parallel flat sheets of plastic film, bonded together around an outside boundary. The liner is disposable in a flat configuration of minimum thickness, and can then be folded to form a space-efficient rectangular package of substantially constant thickness. Certain liners may include a backrest cushion.

20 Claims, 11 Drawing Sheets

TUB LINER FOR INFANTS BATHTUB

RELATED APPLICATIONS

This application claims the benefit under 35 U.S.C. 119(e) of the filing date of Provisional Application Ser. No. 63/002,934, filed Mar. 31, 2020, for "TUB LINER FOR INFANT'S BATHTUB".

BACKGROUND

Field of the Invention

This invention relates to replaceable coverings to reduce cross contamination of pathogens in a field of operation. It is particularly directed to a disposable liner for a reusable bathtub to provide a clean interface between the bathtub and an infant during the infant's bath.

State of the Art

This covering fills a need to bathe hospitalized infants in a way which significantly reduces stress on the infant and minimizes cross contamination between infants. Generalized tubs in which to bathe infants are commercially available. Certain of such infant bathtubs may possess various ledges, rails, backrests, and/or other custom features forming nooks and crannies that are difficult to sufficiently clean between uses of the tub. These commercially available tubs are not custom designed for the comfort of preterm and newborn infants, nor do they provide the supports needed for parent involvement during bathing. Commercially available tubs also do not commonly possess a thermometer for water temperature. Generally, infant bathtubs are inherently capable of multiple reuses with one user, and are not considered to be disposable.

Hospitalized infants are bathed regularly, and if not done correctly, bathing can cause physiologic compromise and stress to the infant. Infants are bathed for general hygiene, and they are bathed for therapeutic benefits. Family involvement is integral to the health of a hospitalized infant. Bathing with a tub with adequate supports and a clean liner for minimizing cross contamination enhances family involvement during bathing. In addition, bathing in the hospital transfers to care at home.

In a medical setting, practices that involve reusing patient appliances, such as a bathtub, require procedures to minimize cross contamination and hospital acquired infections. To minimize such risk, a disposable liner is used in addition to cleaning the item. Unfortunately, commercially available liners suffer from usability, undesirable visual appearance, insufficient conformance of the liner to the cavity defined inside the bathtub, liner packaging, marketability, and other issues. It would be an improvement to provide a tub liner that addresses at least one of such issues.

BRIEF SUMMARY OF THE INVENTION

The invention may be embodied as a liner for an infant's bathtub. A first embodiment includes a fluid resistant top sheet and a bottom sheet. The top sheet may be manufactured as a solid continuous and transversely flexible membrane element that can be oriented in substantially a single plane. In general, the top sheet (and typically also the bottom sheet) is transversely flexible to conform to an interior 3-D fluid-holding shape defined by the bathtub. Typically, the maximum width of the liner is between about 24 and 30 inches, and the maximum length of the liner is between about 26 and 43 inches.

A workable top sheet has an outside boundary circumscribing an uninterrupted central region. Typically, the maximum area encompassed by the top sheet is smaller than the total 3-D rim-to-rim surface area of the bathtub. In preferred embodiments, the outside boundary of the top sheet suggests an ovaloid shape having rounded corners. Preferably, the top sheet is transparent or translucent to permit a user to see through the top sheet. For example, a user may desire visual observation through the top sheet of a thermometer that is installed on the bathtub.

The bottom sheet may also be manufactured as a transversely flexible membrane element that can be oriented in substantially a single plane. A workable bottom sheet has an outside boundary that is sized and shaped in agreement with the outside boundary of the top sheet. Further, an inside boundary of the bottom sheet is spaced apart from the outside boundary of the bottom sheet to form a liner collar and a liner aperture. The width of the liner collar may vary in accordance with a location around the periphery of the liner aperture. In certain cases, the collar may be wider at left and right sides compared to collar width at the top and/or bottom of the liner.

It is preferred that the bottom sheet aperture is sized smaller in both length and width compared to corresponding maximum length and maximum width of the bathtub. Consequently, part of the liner collar fits under the bathtub rim, resists fluid flow between the liner and bathtub, and also helps to maintain registration of the liner with respect to the tub. The bottom sheet aperture may be sized in general agreement with a cross-section of bathtub wall at an installed liner configuration. In certain embodiments, part of or the entire aperture may even fit snuggly against a portion of an upstanding tub wall at an elevation below the tub rim. That is, a portion of the periphery of the aperture of an installed liner may engage a portion of the exterior of an upstanding bathtub wall below the bathtub rim.

A joint is formed between the outside boundaries of the top sheet and the bottom sheet. Desirably, the joint is effective to resist fluid flow. A workable joint is configured to urge local peripheral portions of the top sheet and the bottom sheet to remain substantially in parallel orientation. In certain cases, the joint extends completely around the outside boundaries of the top sheet and the bottom sheet. A preferred joint permits bending and folding the joint and liner to facilitate retail packaging in an optimized small space, and for installation of the liner onto a bathtub.

A second embodiment may include a backrest cushion disposed between the top sheet and the bottom sheet. A backrest cushion may be affixed to the top sheet and the bottom sheet along a sub-portion of the joint. A backrest cushion may alternatively be affixed to either the top sheet or the bottom sheet. If present, a backrest cushion may be structured and arranged in harmony with the top sheet to provide a location indication element to assist in orientation and installation of the liner onto the infant's bathtub. One workable backrest cushion is formed from a material selected from the group including bubble wrap, expanded foam, other materials that provide a softening of the hard surface of a bathtub, sometimes may even provide thermal insulation, and the like.

In certain embodiments, an area defined within the top sheet outside boundary is sized larger than a bathtub opening. Such size mismatch is effective to permit drawing the top sheet into the bathtub to wrap the top sheet around a portion of the bathtub rim and to dispose the top sheet in contact with internal bathtub structure including a backrest. Sometimes, part of the bottom sheet may also conform to an interior portion of the 3-D shape of the bathtub.

The top sheet and bottom sheet outside boundaries may be configured and arranged such that a portion of liner collar is inevitably drawn into the interior of the bathtub during installation of the liner onto a bathtub. In certain cases, a portion of the bathtub rim can be entrapped in a space substantially defined by the bottom sheet. Other times, a portion of the bathtub rim may be entrapped in a space substantially defined by the bottom sheet and the top sheet.

The invention may be embodied as a liner for an infant's bathtub, including a transparent plastic top sheet and a plastic bottom sheet. The top sheet may be disposed in one configuration as a solid continuous membrane element oriented in substantially a single plane and having a peripheral boundary circumscribing an uninterrupted central region. A workable top sheet may have a membrane thickness of between about 0.001 inches and about 0.006 inches. Desirably, the peripheral boundary of the top sheet suggests an ovaloid shape having rounded corners.

Similarly, a bottom sheet may be disposed in one configuration as a membrane element oriented in substantially a single plane. The bottom sheet may also have a membrane thickness of between about 0.001 inches and about 0.006 inches. The exterior peripheral boundary of the bottom sheet is typically sized and shaped in agreement with the peripheral boundary of the top sheet to facilitate forming a joint there-between. An interior peripheral boundary of the bottom sheet is spaced apart from the exterior peripheral boundary of the bottom sheet to form a liner collar and a liner aperture. The liner aperture is desirably smaller than a rim boundary size of the bathtub.

The joint is desirably fluid-resistant and bendable. For example, a workable joint includes a thermally fused joint formed between the peripheral boundary of the top sheet and the exterior peripheral boundary of the bottom sheet. Typically, the joint extends around the entire peripheral boundary of the top sheet. Desirably, the joint is configured to urge local peripheral portions of the top sheet and the bottom sheet to remain substantially in a parallel orientation while still permitting the liner to be folded for purpose of consumer packaging. A preferred joint also permits bending or manipulating portions of the top and bottom sheets away from the parallel orientation for purpose of installation of the liner onto a bathtub.

Another embodiment may include a backrest cushion disposed between the top sheet and the bottom sheet. The cushion may be affixed to the top sheet, or to the bottom sheet, or to both top and bottom sheet along a sub-portion of the joint at the peripheral boundary. Desirably, the cushion is visible through the top sheet to provide orientation-indication to facilitate installation of the liner onto the infant's bathtub.

A most preferred liner is structured to fit an infant's bathtub having maximum length, width, and height of 22"×18"×6.5", respectively. That liner has a width of about 27.5 inches, and a length of about 29 inches. A top corner radius is about 11 inches, and a bottom corner radius is about 9 inches. An aperture maximum length is about 19.5 inches, and an aperture maximum width is about 15.5 inches. A top collar width is about 5 inches, left and right collar widths are about 6 inches, respectively, and a bottom collar width is about 4 inches. A top aperture radius is about 7 inches, and a bottom aperture radius is about 4 inches. An optional backrest has a maximum width of about 6 inches and is about 13 inches long. Workable sizes are believed to be ± about 5%, 10%, 20%, 30%, or even more. Radii and widths may not be constant. Different sizes would be expected for liners structured to fit well on alternative infant bathtubs.

Liner top and bottom sheets may be made from fluid-resistant membrane materials, such as extruded plastic film. A preferred plastic material includes polyethylene, although other plastics, and plastic-like materials, are workable. It is desirable for the membrane material to be transversely deformable to conform to the various 3-dimensional contours and shapes found in an infant's bathtub. Also, it is desirable for the material to be relatively "soft" to reduce noise from crinklyness. A further benefit would include enhanced biodegradability. It is also preferable for the material to be fusible to create a joint that allows the top and bottom sheets to remain flat and parallel to one another. Also, a preferred joint is bendable to facilitate subsequent folding and bending the liner for consumer packaging. The preferred foldable but initially flat configuration permits space-efficient liner folding to form a folded liner having a substantially constant thickness.

Consumer packages may be created containing any desired number of liners. Currently, it is contemplated to provide single-item packages, and boxes containing perhaps 20 or 25 liners, or more. Sometimes, liner(s) may be packaged in kits with other bathing supplies such as single-use baby wash packet, scalp brush and wash cloths. Liners may be provided with and without a padded back support. Any number of boxes may be bundled in a case, with a current goal of providing about 100 liners in a delivered case.

BRIEF DESCRIPTION OF THE DRAWINGS

In the drawings, which illustrate what are currently considered to be the best modes for carrying out the invention.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

Figure 1:
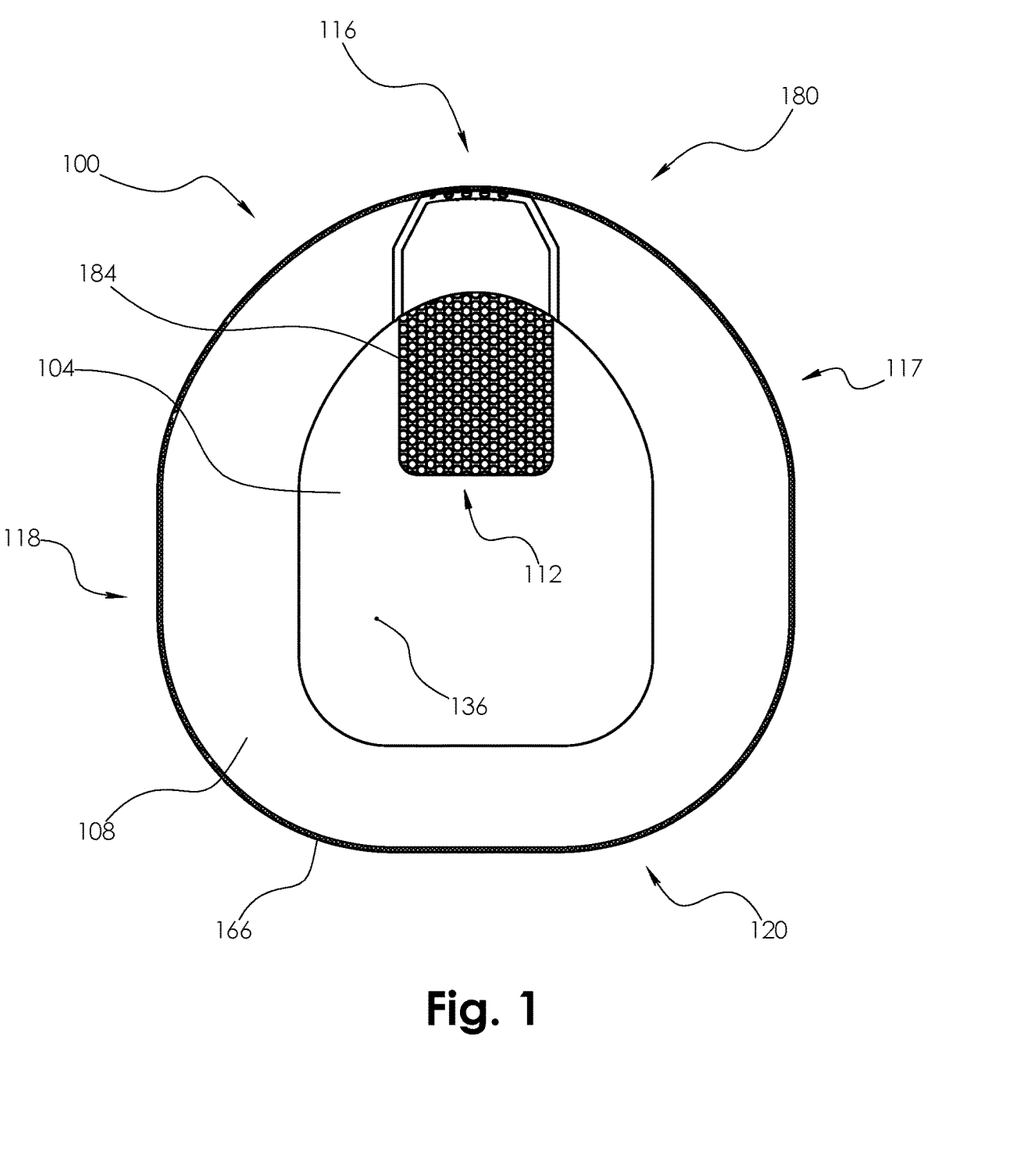
FIG. 1 is a bottom view of a first embodiment.

A first embodiment of a bathtub liner structured according to certain principles of the invention is indicated generally at 100 in FIG. 1. The liner 100 includes a top sheet 104, a bottom sheet 108, and an optional backrest cushion, generally indicated at 112, disposed between the top sheet and the bottom sheet. Liner 100 has a top end, generally 116, a left side, generally 117, a right side, generally 118, and a bottom end, generally 120. It is preferred for a bottom sheet and/or a top sheet to be translucent, or preferably, transparent.

Figure 2:
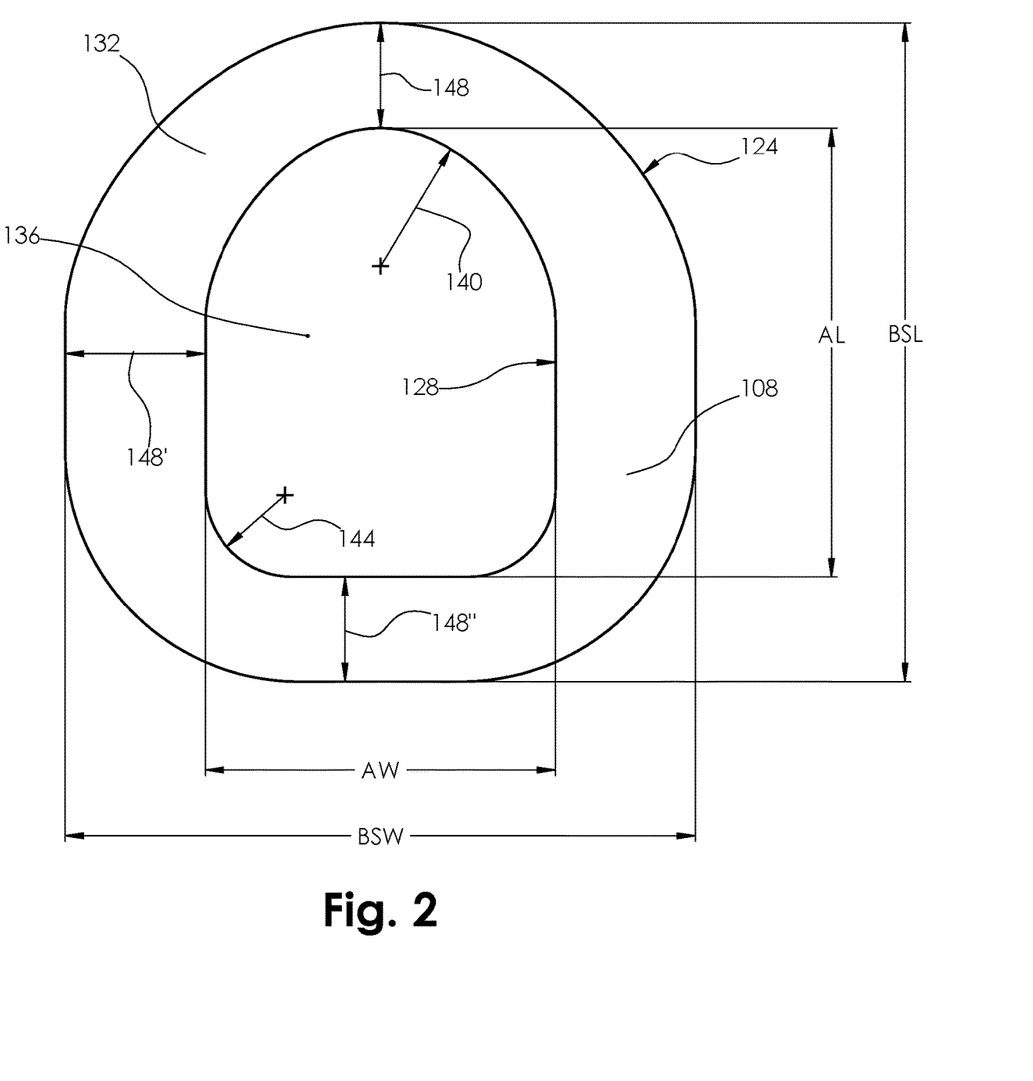
FIG. 2 is a plan view of a bottom sheet element of the embodiment in FIG. 1.

With reference to FIG. 2, the illustrated bottom sheet 108 is a membrane element disposed in a flat or planar configuration, and has an outside boundary 124 that is spaced apart from an inside boundary 128 to form a collar 132, and a liner aperture 136. The aperture 136 provides a through-hole communicating through the bottom sheet 108. A constant or variable radius 140 may define a top perimeter shape of the aperture 136. A bottom perimeter shape of aperture 136 may be defined by one or more radius 144. Again, radius 144 may be a constant or variable length. Perimeter portions of the aperture 136 may be linear, or the entire perimeter of aperture 136 may be nonlinear. As detailed further below, it is desired that the aperture 136 is sized and shaped to fit in general agreement with an upstanding wall element of an infant's bathtub, at a location disposed below the tub's rim.

Still with reference to FIG. 2, the width of a collar 132 can vary around the perimeter of the aperture 136 to best fit in agreement with the conformation of a particular bathtub. Illustrated collar 132 has a top width 148, a side collar width 148', and a bottom collar width 148". An aperture 136 has an aperture maximum length AL, and an aperture maximum width AW. A bottom sheet has a maximum length BSL, and a maximum width, BSW. The lengths and widths of a bottom sheet and aperture may also be selected to fit in general agreement with a particular infant's bathtub.

Figure 3:
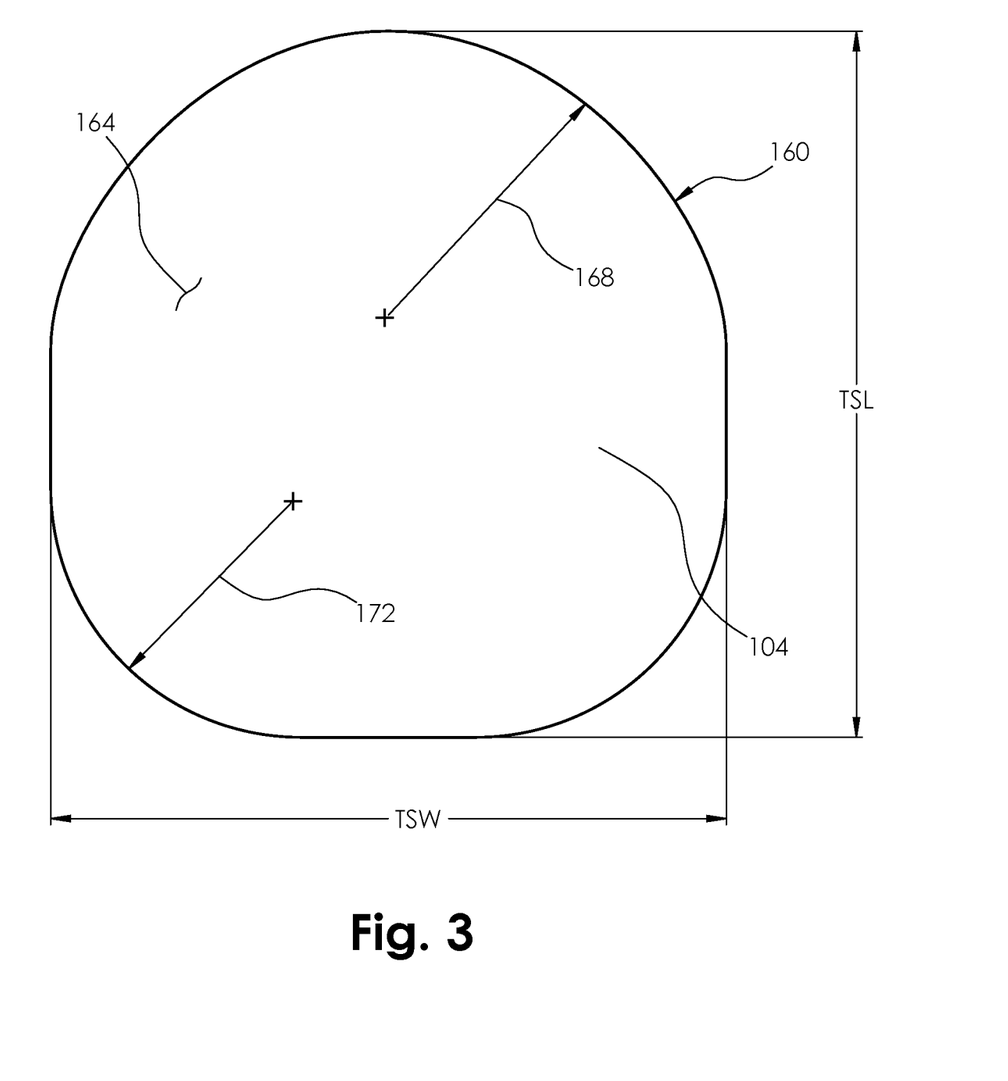
FIG. 3 is a plan view of the top sheet element of the embodiment in FIG. 1.

With reference now to FIG. 3, top sheet 104 is a solid continuous membrane element disposed in a flat or planar configuration, and has an outside boundary 160. The outside boundary 160 circumscribes an uninterrupted central region having a surface 164 that defines a maximum surface area encompassed by a top sheet 104. It is currently preferred that the outside boundary 160 is arranged to suggest an ovaloid shape having rounded corners, as illustrated.

It is further desired for the outside boundary 160 to be sized and arranged in agreement with the bottom sheet outside boundary 124 to facilitate making a joint 166 between at least top sheet 104 and bottom sheet 108 (see FIG. 1). That is, top sheet maximum width TSW and top sheet maximum length TSL, agree with BSW and BSL, respectively. Further, top sheet radii 168 and 172 (or variable functional equivalents there-to) agree with corresponding bottom sheet radii or shape-defining functional equivalents there-to. Portions of an outside boundary may be linear, or the entire outside boundary may be nonlinear. Desirably, joint 166 is configured to urge local peripheral portions of the top sheet 104 and the bottom sheet 108 to remain substantially in parallel orientation. The preferred joint construction provides a very flat liner in one configuration, but permits bending of relevant portions of the liner for space-efficient liner packaging, and transversely bending or folding all portions of an installed liner to accommodate sufficiently to a 3-dimensional fluid-holding shape of an infant's bathtub.

With reference again to FIG. 1, it is desirable to provide some sort of orientation-indicating element, generally indicated at 180, to facilitate installation of a liner onto an infant's bathtub. An indicating element may include colored indicia, arrow, printed instruction, or even the optional cushion 112. The cushion 112 generally illustrated in FIG. 1 can be specifically embodied as a bubble wrap cushion 184, or a cushion made from expanded foam of some sort. Bubble wrap material is commercially available, and can be cut to size and affixed in place with respect to a liner according to known techniques. Bubble wrap material may be colored, and/or translucent, "clear", or substantially transparent. However, it has been discovered that even a "clear" bubble wrap cushion 184 is visible through a preferred top sheet 104, and is helpful to orient the liner by positioning cushion 184 for registration with backrest structure of a bathtub. An exemplary expanded foam is sold on-line by the ULINE Company having a web site located at world wide web.u-line.com. A workable expanded foam is identified by ULINE model No. S-2481P, and has a thickness of ⅛".

Figures 4A, 4B:
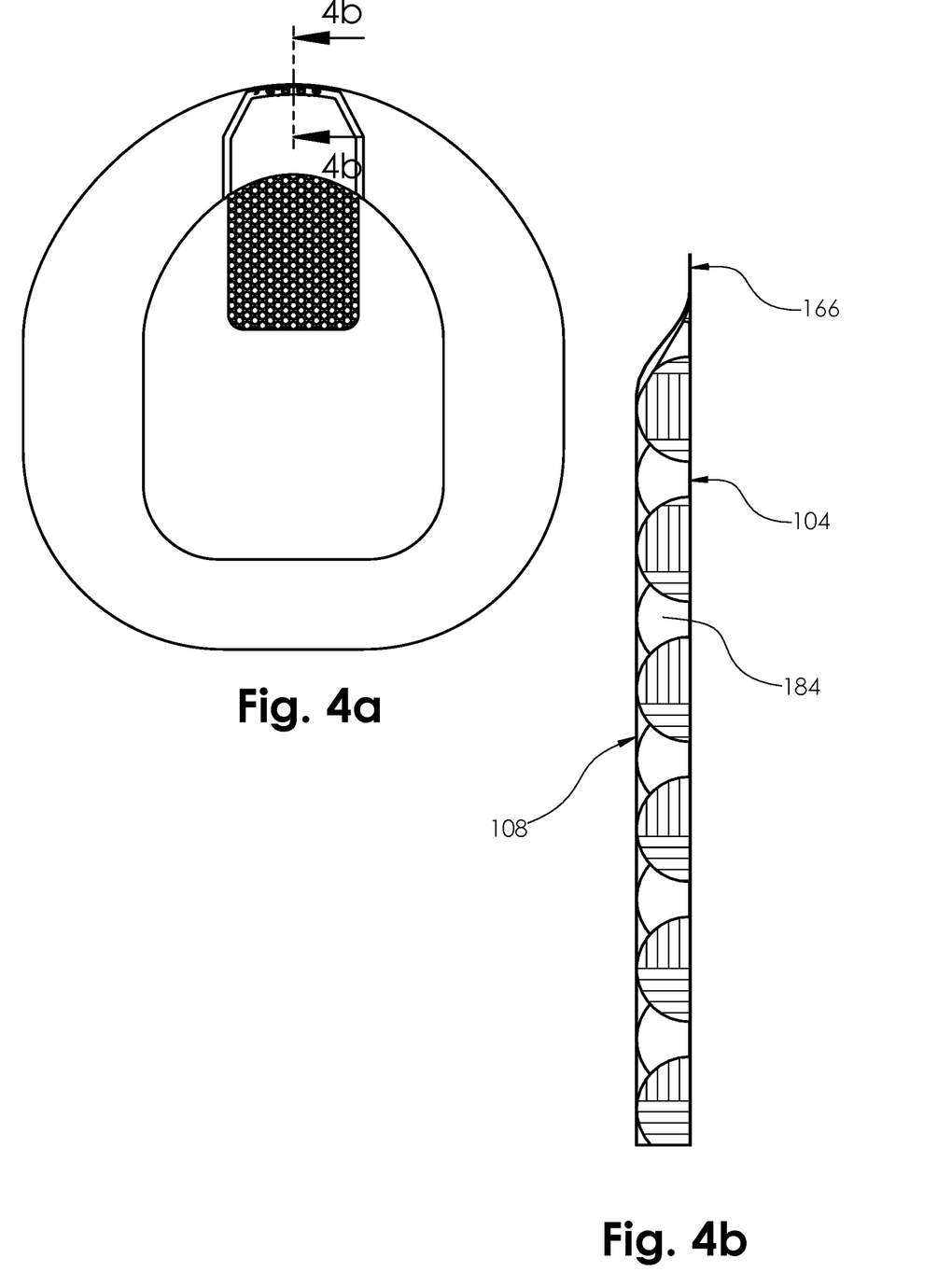
FIG. 4a is a duplicate of FIG. 1.
FIG. 4b is a side view of the section indicated by 4b-4b in FIG. 4a, and looking in the direction of the arrows.
Figure 5:
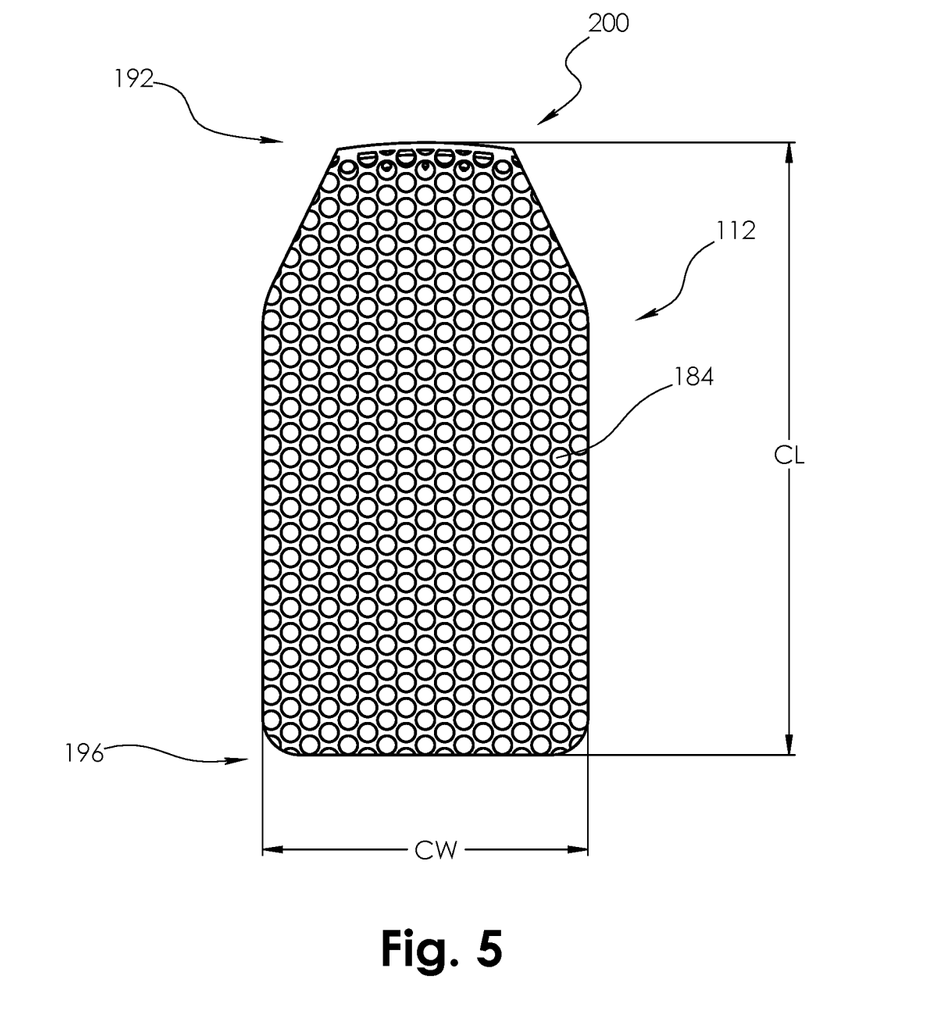
FIG. 5 is a plan view of a backrest cushion element of the embodiment in FIG. 1.
Figure 6:
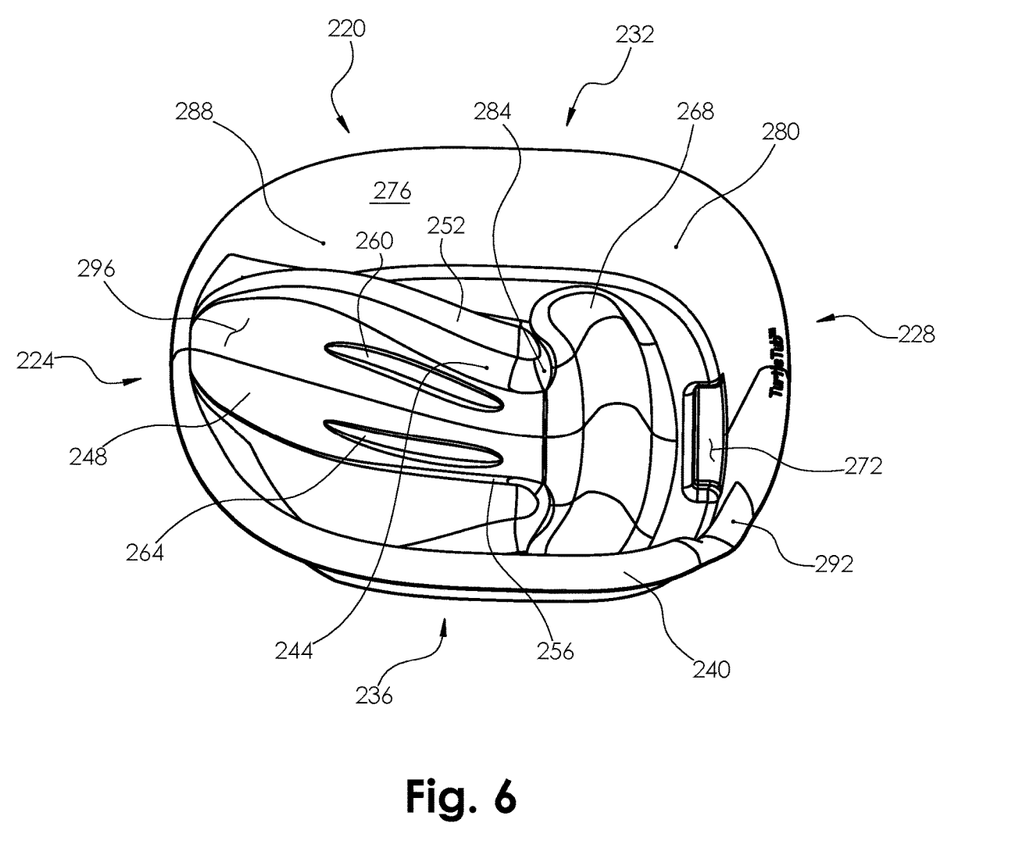
FIG. 6 is a slight perspective view from above, looking down into the water receiving cavity side of a commercially available infant's bathtub.
Figure 7:
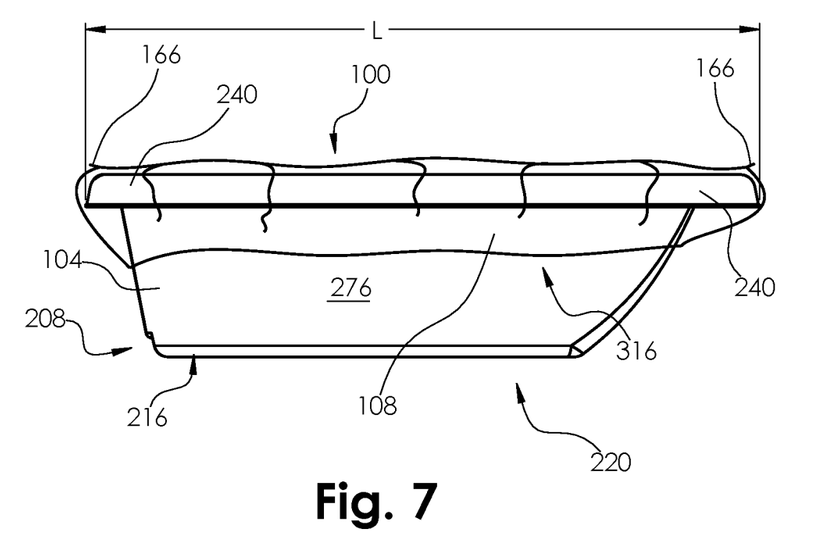
FIG. 7 is a right side view of a liner installed on the bathtub of FIG. 6.
Figure 8:
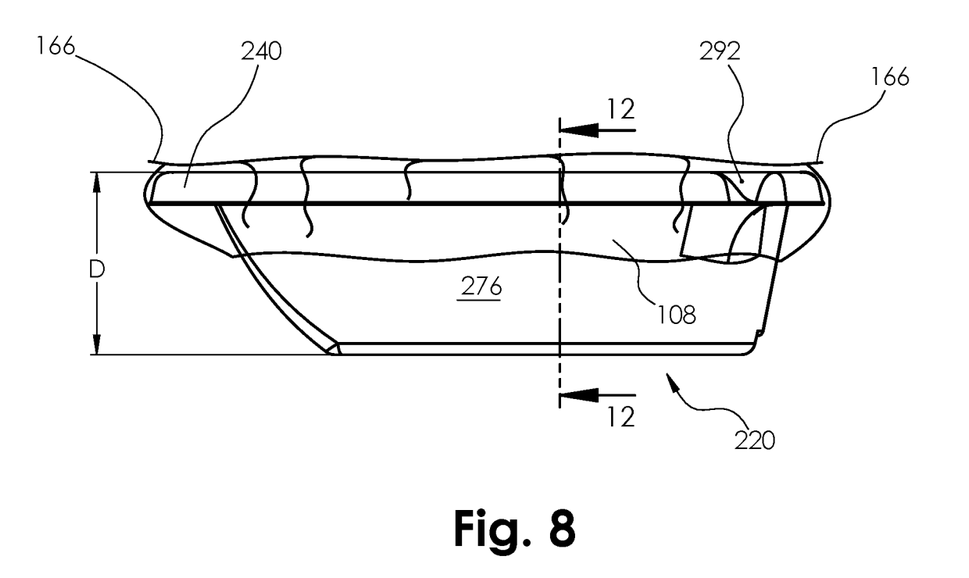
FIG. 8 is a left side view of a liner installed on the bathtub of FIG. 6.
Figure 9:
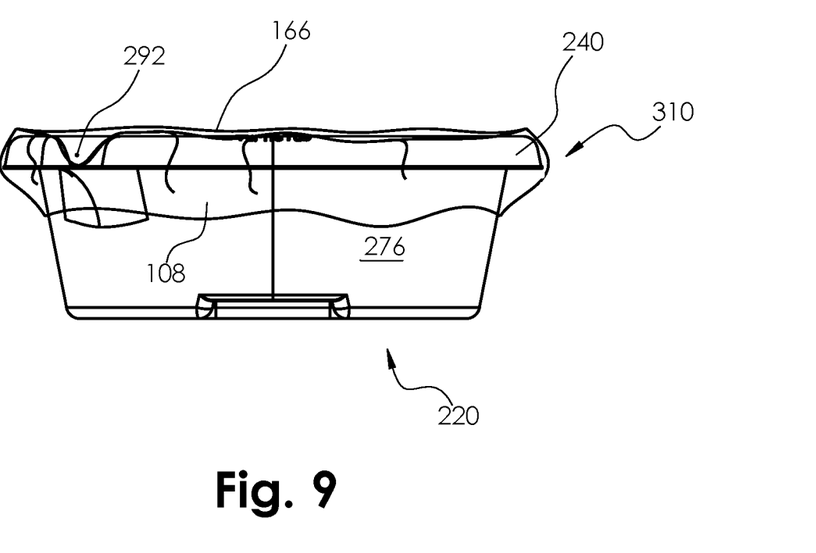
FIG. 9 is a bottom view of a liner installed on the bathtub of FIG. 6.
Figure 10:
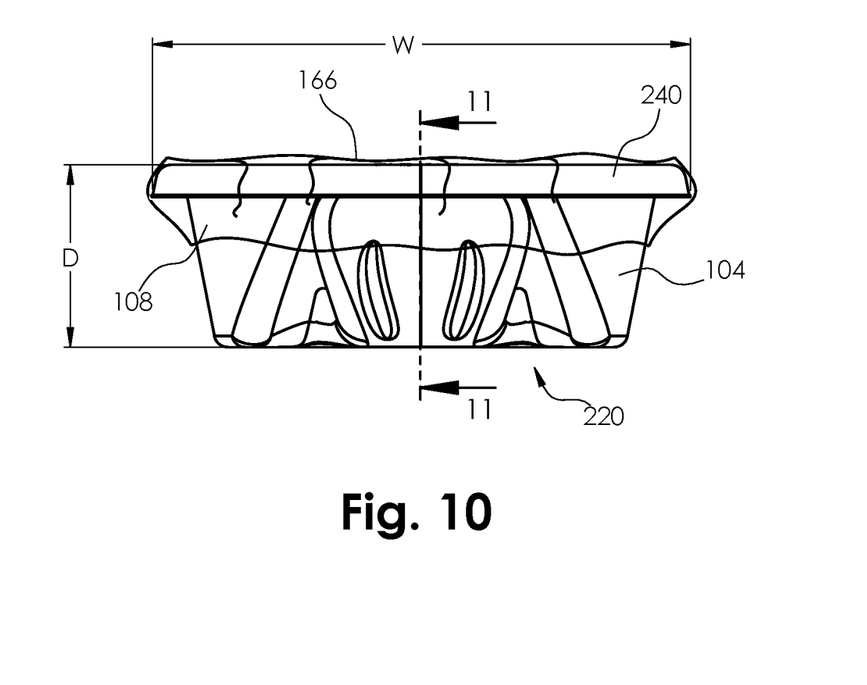
FIG. 10 is a top view of a liner installed on the bathtub of FIG. 6.

A currently preferred backrest cushion 184 will now be described with particular reference to FIGS. 4a, 4b, and 5. A cushion 112 has a cushion width CW, and a cushion length CL. Sometimes, CW and CL substantially define the minimum folded width and length of a packaged liner. Cushion thickness is desirably less than about 0.25 inches. A cushion 112 has a top end 192 and a bottom end 196.

While a rectangular cushion 112 is workable, sometimes it is preferred to shape a cushion 112 in alternative ways. For example the bottom end 196 can have rounded corners, as illustrated. The top end 192 may be trimmed in width to reduce the amount of top end that is incorporated at a top boundary, generally 200, in the joint 166. The illustrated top cushion shape in FIG. 5 permits folding a portion of thinner 2-layer liner joint 166 at a location spaced apart from a 3-layer portion of joint 166, and consequently reduces the thickness of a folded liner that is ready for packaging.

It is recognized that an alternative cushion 112 may be formed from a variety of different materials. Workable materials for a cushion 112 provide a softening or cushioning effect between the baby and the backrest of a bathtub. Desirably, the cushion will also function as a thermal insulator to reduce heat loss from the baby and/or water through the tub's backrest. Alternative cushions 112 may have different sizes and shapes as desired, e.g., to fit in registration with the various backrests of different particular bathtubs.

A cushion 112 may even be formed as an integral part of a top sheet 104. For example, a top sheet 104 can be formed to provide a local area of dimples similar to a bubble wrap sheet. Certain workable cushion materials may be affixed to the liner at a common area or length of peripheral joint 166. A cushion 112 may also be affixed to either the top sheet 104 or the bottom sheet 108. For a non-limiting example, a length of two-sided tape is workable in certain embodiments. The cushion may be affixed to a liner sheet at one end, both ends, along a portion of the cushion length, or a combination of the above. It is currently preferred to incorporate the cushion top boundary 200 in the joint 166 as the sole attachment of a cushion 112 to the other liner elements.

A commercially available infant's bathtub is illustrated in FIGS. 6-13, and generally indicated at 220. Bathtub 220 includes a top end 224 (infant's head end), a bottom end 228, a right side 232, and a left side 236. Tub 220 has a maximum length L of about 22 inches (FIG. 7), a maximum width W of about 18 inches (FIG. 10), and a depth D of about 6.5 inches (e.g., FIG. 8).

A rim 240 circumscribes a tub opening 244. Opening 244 is sometimes oriented in a single plane defined by the rim 240. In some case, tub opening 244 may be characterized as being defined by an infinite number of parallel line segment widths, each line segment width spanning symmetrically with respect to the tub—length centerline to terminate on corresponding high points of opposite rims.

Tub 220 also includes various support structures. Illustrated support structures include a backrest 248, which typically includes right and left side rails 252 and 256, respectively. In certain cases, a pair of alignment ribs 260, 264 may also be included. A hip and knee-flexing seat 268 is disposed at the bottom backrest 248. Preferred tubs 220 include an instrument shelf 272, which can hold a thermometer at an operable orientation and position for: 1) view by the health practitioner during an infant's bath; and 2) to avoid a heat sink so the thermometer will provide accurate temperature indication.

A plurality of cavities are defined between upstanding tub wall 276 and the aforementioned support structures. Desirably, cavities are configured (e.g., with large radius corners), to avoid formation of nooks and crannies that are hard to clean. Certain such cavities include foot cavity 280, seat cavity 284, and side cavity 288. If present, a pour spout 292 may also be considered as another cavity disposed in the rim 240.

A liner 100 constructed to fit the tub 220 includes a bottom sheet 108 wherein a top collar width 148 is about 4 inches, left and right side collar widths 148' are about 6 inches, and a bottom collar width 148" is about 5 inches (see FIG. 2). A top sheet 104 includes a TSL of about 29 inches, and a TSW of about 27.5 inches. A grossly simplified radius 168 is about 11 inches (in one embodiment there are two distinct approximate centers of curvature for spaced-apart radii 168), and simplified radii 172 are about 9 inches in length. The width CW of a cushion 184 is about 6 inches, and the cushion length CL is about 13 inches. Top sheet 104 and bottom sheet 108 are made from substantially transparent extruded polyethylene plastic sheet, and the cushion 184 is made from clear bubble wrap, and generally rectangular but modified as illustrated in FIG. 5.

Figure 11:
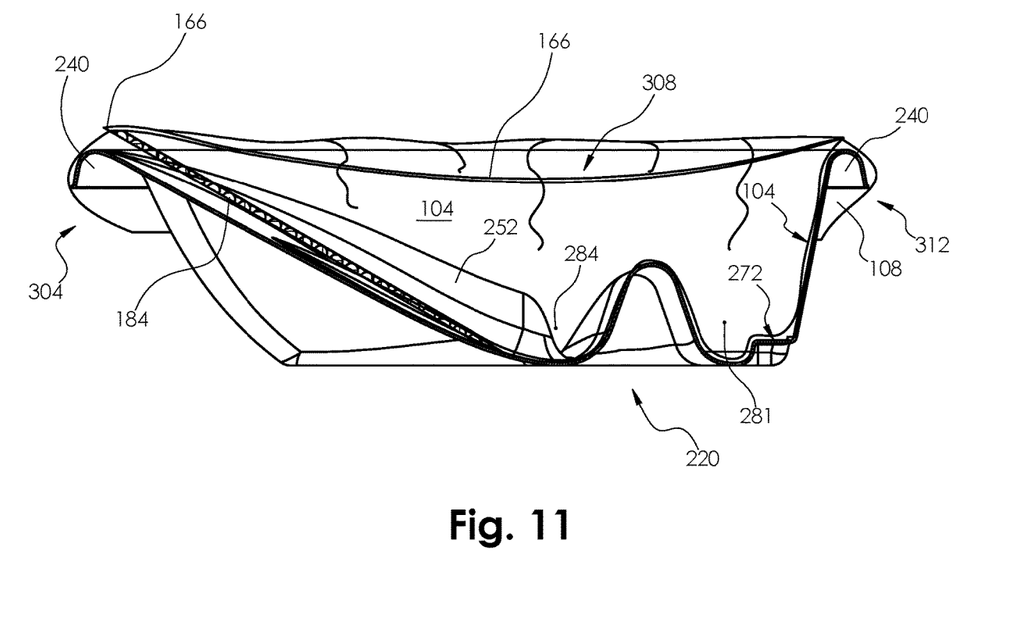
FIG. 11 is a cross-section view taken lengthwise and at a middle of a liner installed on the bathtub of FIG. 6.
Figure 12:
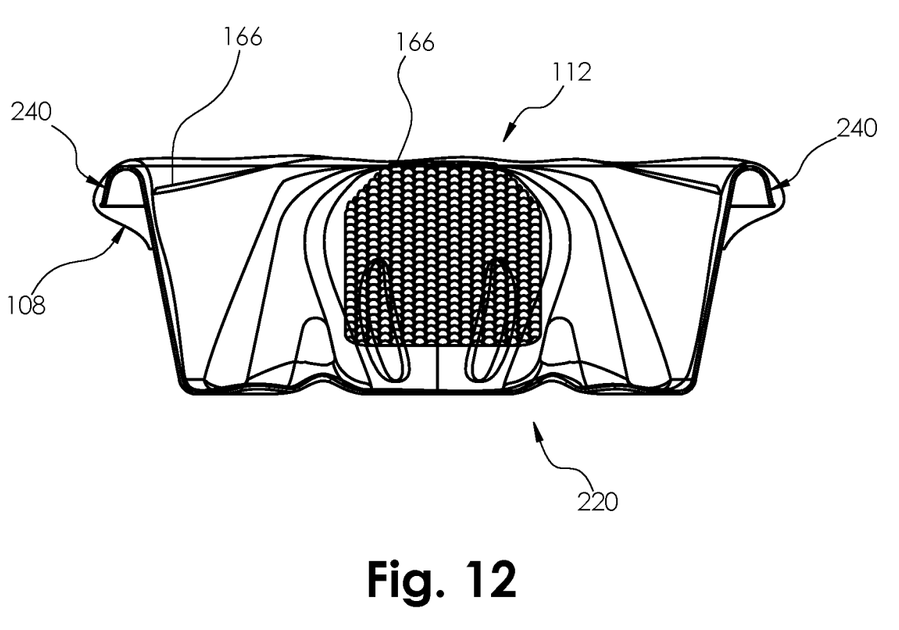
FIG. 12 is a cross-section view, taken at section 12-12 in FIG. 8 and looking in the direction of the arrows, of a liner installed on the bathtub of FIG. 6.
Figure 13:
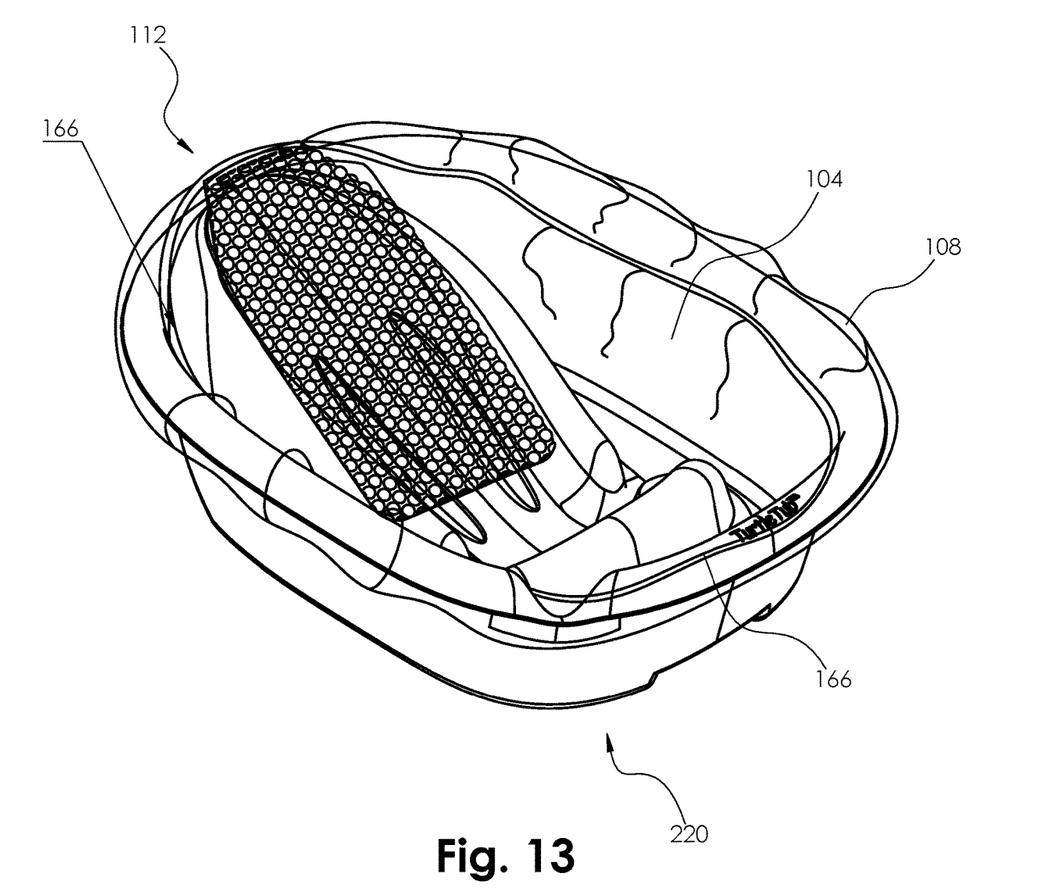
FIG. 13 is a top view in perspective of a liner installed on the bathtub of FIG. 6.

One operable method of installation will now be described with primary reference to FIGS. 6-13. First, spread out a packaged liner 100 and orient the liner top 116 with the top end 224 of a tub 220 (e.g., orient cushion 112 with tub's backrest 248). Then, insert top end 224 of the tub through aperture 136 so that a top portion of liner joint 166 approaches a top portion of tub rim 240. The top tub end 224 will be disposed between bottom sheet 108 and cushion 184, and cushion 184 will be engaging tub backrest surface 296. Stretch the aperture 136 slightly to insert the bottom end of the tub 220 through the aperture and into the interior of the liner 100. For example, pull a bottom perimeter portion of aperture 136 in a direction away from the top end 116 and then down and over a corresponding bottom portion of tub rim 240 (sometimes, a small amount of "stretch" (or even plastic deformation), in liner material can be helpful). Align the joint 166 with the top of the tub 200 to entrap a top portion of rim 240 between the top sheet 104 and bottom sheet 108 at the area indicated by 304 (see FIG. 11). Press top sheet 104 transversely down into various tub cavities, including 280, 284, and 288. Pressing the liner into the cavities will inevitably draw a side portion of joint 166 and collar 132 into tub side cavity 228 (e.g., see area indicated by 308 in FIGS. 11 and 12). This is because a rim-to-rim path following the tub surface is longer than the width TSW of top sheet 104. Consequently, part of the collar side width 148' must be extended into the tub side cavity 188, and a portion of joint 166 is disposed inside the tub's fluid-holding cavity. A side portion of bathtub rim 240 is entrapped in a space substantially defined by only the bottom sheet 108 (area indicated generally by 310, FIG. 12). When the top sheet is substantially pressed into the tub's various nooks and crannies, a bottom portion of rim 240 may be entrapped in a space defined by top sheet 104 and bottom sheet 108, as indicated generally at 312 (FIG. 11). It is preferred to smooth down top sheet 104 to fit without wrinkles against a thermometer disposed on instrument shelf 272. As illustrated in FIGS. 7-10, it is preferred for a portion of the collar of an installed liner to fit under the tub rim at least substantially around the entire perimeter of aperture 136. As illustrated, a portion of the periphery of the aperture 136 of an installed liner 100 may engage a portion of the exterior of an upstanding bathtub wall 276, at a location below the bathtub rim and indicated generally at 316 (e.g., FIG. 7).

The liner and tub are now ready to fill with water and bathe an infant. Subsequent to the bath, the installed liner 100 may be removed, thrown away, and replaced by a fresh liner 100 for the next use of tub 220.

While aspects of the invention have been described in particular with reference to certain illustrated embodiments, such is not intended to limit the scope of the invention. The present invention may be embodied in other specific forms without departing from its spirit or essential characteristics. For example, one or more element may be extracted from one described or illustrated embodiment and used separately or in combination with one or more element extracted from one or more other described or illustrated embodiment(s), or in combination with other known structure. Certain embodiments disclosed herein may illustrate optional features. As one example, it is within contemplation that a padded backrest may sometimes be omitted. Padding and liner perimeter shapes may be embodied in alternative shapes to those illustrated. That is, corners may be sharper or more defined, including square, or more rounded, or suggesting other geometric configurations. Padding may be incorporated into a top sheet as a constituent element; padding may cover additional area, including the entire top sheet. The edge perimeter of certain liners may terminate in an elastic element to draw the liner into contact with a tub under the tub's rim. Certain liners may be formed from a single sheet, e.g., folded and bonded around three sides. Therefore, the described embodiments are to be considered as illustrative and not restrictive. Obvious changes within the capability of one of ordinary skill are encompassed within the present invention.

The scope of the invention for which a monopoly position is currently desired is indicated by the appended claims rather than by the foregoing description. All changes which come within the meaning and range of equivalency of the claims are to be embraced within their scope.

What is claimed is:

1. A liner for an infant's bathtub, comprising:
   a fluid resistant top sheet, the top sheet residing in one configuration as a solid continuous membrane element oriented in substantially a single plane and having an outside boundary circumscribing an uninterrupted central region;
   a bottom sheet, the bottom sheet residing in one configuration as a membrane element oriented in substantially a single plane, an outside boundary of the bottom sheet being sized and shaped in agreement with the outside boundary of the top sheet, an inside boundary of the bottom sheet being spaced apart from the outside boundary of the bottom sheet to form a liner collar and a liner aperture; and a joint formed between the outside boundaries of the top sheet and the bottom sheet, the joint being configured to urge local peripheral portions of the top sheet and the bottom sheet to remain substantially in parallel orientation.

2. The liner according to claim 1, further comprising:
a backrest cushion disposed between the top sheet and the bottom sheet.

3. The liner according to claim 2, wherein:
the backrest cushion is affixed to the top sheet and the bottom sheet along a sub-portion of the joint.

4. The liner according to claim 2, wherein:
the backrest cushion is structured and arranged in harmony with the top sheet to provide a location indication element to assist in orientation and installation of the liner onto the infant's bathtub.

5. The liner according to claim 1, wherein:
the top sheet is transparent or translucent to permit visual observation of a thermometer there-through.

6. The liner according to claim 1, wherein:
the aperture is sized smaller in both length and width compared to corresponding maximum length and maximum width of the bathtub.

7. The liner according to claim 1, wherein:
the aperture is sized in general agreement with a cross-section of bathtub wall at an installed liner configuration.

8. The liner according to claim 1, wherein:
a width of the liner collar varies in accordance with a location around the periphery of the liner aperture.

9. The liner according to claim 8, wherein:
the liner collar is wider at left and right sides compared to collar width at the top and bottom of the liner.

10. The liner according to claim 1, wherein:
the top sheet is transversely flexible to conform to an interior 3-D fluid-holding shape defined by the tub.

11. The liner according to claim 1, wherein:
an area defined within the top sheet outside boundary is sized larger than a bathtub opening, to permit drawing the top sheet into the bathtub to wrap the top sheet around a portion of the bathtub rim and to dispose the top sheet in contact with internal bathtub structure including a tub backrest.

12. The liner according to claim 1, wherein:
the top sheet and the bottom sheet outside boundaries are configured and arranged such that a portion of the liner collar is inevitably drawn into the interior of the bathtub during installation of the liner on the bathtub.

13. The liner according to claim 1, wherein:
a portion of the periphery of the aperture of an installed liner engages a portion of the exterior of an upstanding bathtub wall below the bathtub rim.

14. The liner according to claim 11, wherein:
the area of the top sheet is smaller than the total 3-dimensional rim-to-rim surface area of the tub.

15. The liner according to claim 1, wherein:
the top sheet and bottom sheet outside boundaries are configured and arranged such that a portion of the liner collar is inevitably drawn into the interior of the bathtub during installation of the liner onto a bathtub; and a portion of the bathtub rim is entrapped in a space substantially defined by the bottom sheet.

16. The liner according to claim 1, wherein:
the back rest cushion is formed from a material selected from the group consisting of bubble wrap, and expanded foam.

17. The liner according to claim 1, wherein:
the joint extends completely around the outside boundaries of the top sheet and the bottom sheet.

18. The liner according to claim 1, wherein:
the maximum width of the liner is between about 24 and 30 inches; and
the maximum length of the liner is between about 26 and 43 inches.

19. A liner for an infant's bathtub, comprising:
a transparent plastic top sheet, the top sheet residing in one configuration as a solid continuous membrane element oriented in substantially a single plane and having a peripheral boundary circumscribing an uninterrupted central region, the top sheet having a membrane thickness of between about 0.001 inches and about 0.006 inches;

a plastic bottom sheet, the bottom sheet residing in one configuration as a membrane element oriented in substantially a single plane, the bottom sheet having a membrane thickness of between about 0.001 inches and about 0.006 inches, an exterior peripheral boundary of the bottom sheet being sized and shaped in agreement with the peripheral boundary of the top sheet, an interior peripheral boundary of the bottom sheet being spaced apart from the exterior peripheral boundary of the bottom sheet to form a liner collar and a liner aperture, the liner aperture being smaller than a rim boundary size of the bathtub; and a fluid-resistant fused joint formed between the peripheral boundary of the top sheet and the exterior peripheral boundary of the bottom sheet, the joint extending around a portion of the peripheral boundary of the top sheet and being configured to urge local peripheral portions of the top sheet and the bottom sheet to remain substantially in a parallel orientation while still permitting the liner to be folded for purpose of consumer packaging, and bending or manipulating portions of the top and bottom sheets away from the parallel orientation for purpose of installation of the liner onto a bathtub.

20. The liner according to claim 19, further comprising:
a backrest cushion disposed between the top sheet and the bottom sheet, the cushion being affixed to the top sheet, or to the bottom sheet, or to both top and bottom sheet along a sub-portion of the joint at the peripheral boundary, the cushion being visible through the top sheet to provide orientation-indication to facilitate installation of the liner onto the infant's bathtub such that the backrest cushion is in registration with the backrest of the tub.

* * * * *